United States Patent [19]

Rouse et al.

[11] Patent Number: 4,562,438
[45] Date of Patent: Dec. 31, 1985

[54] RADAR APPARATUS

[75] Inventors: David G. Rouse, Halstead; Christopher F. Wilkinson, Hungarton, both of England

[73] Assignee: The Marconi Company Limited, Chelmsford, England

[21] Appl. No.: 305,343

[22] Filed: Sep. 24, 1981

[30] Foreign Application Priority Data

Sep. 27, 1980 [GB] United Kingdom ............... 8031288
Jul. 23, 1981 [GB] United Kingdom ............... 8122717

[51] Int. Cl.$^4$ .................... G01S 7/28; G01S 13/28
[52] U.S. Cl. .................... 343/17.1 R; 343/17.2 PC
[58] Field of Search ............... 343/17.2 R, 17.2 PC, 343/7.7, 17.1 R, 17.1 PF, 17.5 PW

[56] References Cited

U.S. PATENT DOCUMENTS 3,945,011  3/1976  Glasgow .................. 343/17.2 PC
4,096,478  6/1978  Chavez .......................... 343/7.7
4,136,341  1/1979  Mulder et al. .................. 343/7.7 X Primary Examiner—T. H. Tubbesing
Assistant Examiner—Gilberto Barron, Jr.
Attorney, Agent, or Firm—Spencer & Frank

[57] ABSTRACT

A radar transmitter transmits a group of pulses as shown at I of FIG. 2, the group consisting of first short pulse of a frequency $f_1$ transmitted during time interval $t_1$ to $t_2$. A second, longer pulse of frequency $f_2$ is transmitted during time interval $t_2$ and $t_3$ and a third, short pulse of frequency $f_1$ is transmitted during time interval $t_3$ to $t_4$. The return from a close range small target is shown at II and the return from a large source of clutter or another large target at a slightly greater range is shown at III. The return from the larger target or source of clutter is so strong as to saturate the receiver during the time interval $t_7$ to $t_{12}$ and thus the return from the second short pulse during period $t_9$ to $t_{10}$ is obscured as shown at IV. However, since a short pulse is also transmitted before the long pulse its return, at time interval $t_5$ to $t_6$, is not obscured. In other situations where a large source of clutter or a large target is at a slightly closer range than the small target of interest the return during interval $t_5$ to $t_6$ will be obscured but the return of the second pulse during time interval $t_9$ to $t_{10}$ will not be obscured. In this way it is ensured that at least one of the two short pulses is detected.

12 Claims, 4 Drawing Figures

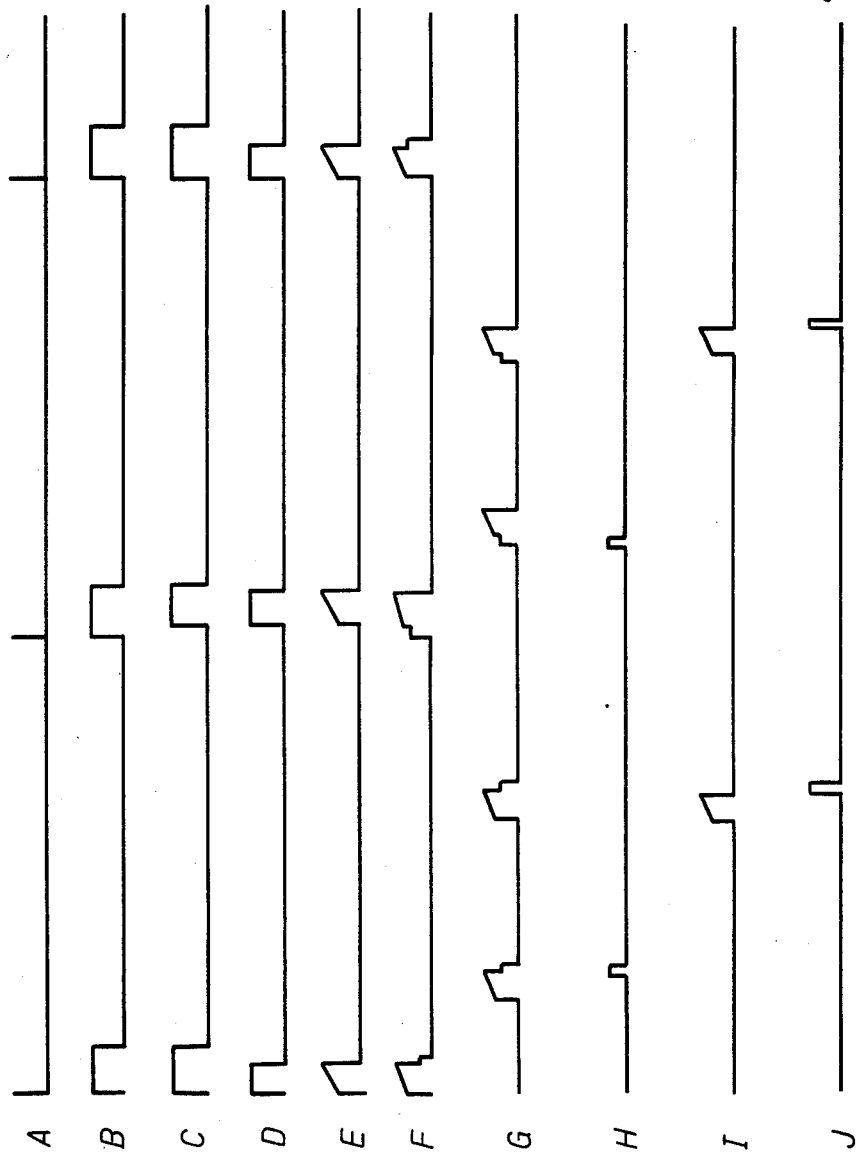

RADAR APPARATUS

BACKGROUND OF THE INVENTION

This invention relates to radar apparatus of the type which transmits groups of pulses, each group including a long pulse for detecting or tracking long range targets and a short pulse for detecting or tracking short range targets.

One such radar apparatus is described in U.K. Patent Specification No. 1552877 and discloses groups of pulses each consisting of a single long pulse, which is frequency swept, followed by a single short pulse, which has a frequency outside a frequency range of the long swept pulse. Additional short pulses are inserted between the groups to increase the pulse repetition frequency of the short pulses.

In radar apparatus of the aforementioned type, it is necessary for initial stages of the receiver to process both the long pulses and the short pulses though these may be separated out into different channels in latter parts of the receiver. A problem arises in the detection of a short range target close to another larger target or to a source of clutter. This larger target (or source of clutter) will produce a strong return signal which will saturate the initial stages of the receiver; i.e. cause "limiting." Should the return of the short pulse from the smaller target be received whilst the receiver is thus saturated, the receiver will fail to detect the short pulse and the small target will not be indicated on the radar output.

BRIEF SUMMARY OF THE INVENTION

This invention provides radar apparatus comprising a transmitter constructed and arranged to transmit a train of pulses arranged in groups the groups being relatively widely spaced compared with the pulses within each group characterised in that some groups comprise a long pulse preceded by a short pulse and in that other groups each comprises a long pulse followed by a short pulse.

Preferably the long pulse of a group is preceded and followed by a short pulse of the same group.

The long pulse of each group is preferably modulated or coded on transmission in a manner which allows pulse compression on reception.

The short pulse or pulses of each group is/are also preferably modulated or coded in a manner which allows pulse compression and these short pulses preferably have different characteristics so that the receiver can distinguish between them.

The receiver preferably includes means for delaying the first short pulse of a group so that it becomes co-extensive with and is then combined with the second short pulse of the same group.

The aforesaid modulation or coding of the long and/or short pulses may be by frequency modulation (e.g., frequency sweeping) or may be amplitude or phase modulation. It may be linear or non-linear. The short pulses of a group if modulated or coded, are preferably modulated or coded in different ways to assist the receiver in distinguishing between them.

A space may be present between some or all pulses of a group but this is not essential and so, for the purposes of this Specification, a single pulse which changes, e.g., frequency, at one or more discrete points is to be considered as being made up of two or more different pulses.

According to another aspect of the invention there is provided radar apparatus comprising: a transmitter for transmitting signals at spaced intervals and a receiver adapted to receive these signals after reflection from a target; the receiver having a first and a second channel and having means for separating each signal into a long and a short part such that a long part follows a short part in at least some of the signals and is followed by a short part in at least some other signals; the receiver further having means for setting a range threshold and for using the long signal parts when received from targets at greater ranges than the threshold and for using the short signal parts when received from targets at smaller ranges than the threshold.

According to another aspect of the invention there is provided a radar system comprising a transmitter for transmitting groups of pulses, each group including pulses of different types, the pulse at the end of each group, except the last group, being of the same type as the pulse at the beginning of the next group.

According to another aspect of the invention there is provided a radar system comprising a transmitter for transmitting groups of pulses, alternate groups including a pulse of a first type followed without any time spacing by a pulse of a second type and the other alternate groups including a pulse of the second type followed, without any time spacing, by a pulse of the first type.

By employing the invention the aforementioned problem is made less severe since the periods when the initial stages of the receiver are saturated by returns of a long pulse from a large source of clutter (or a larger target) at close range cannot coincide with the returns of all the short pulses from a target adjacent to but at a slightly different range to the large source of clutter (or the large target).

BRIEF DESCRIPTION OF THE DRAWINGS

FIG. 4 illustrates, at A to J, waveforms appearing at points denoted by respective reference letters on FIG. 3.

DETAILED DESCRIPTION OF THE PREFERRED EMBODIMENTS

Figure 1:
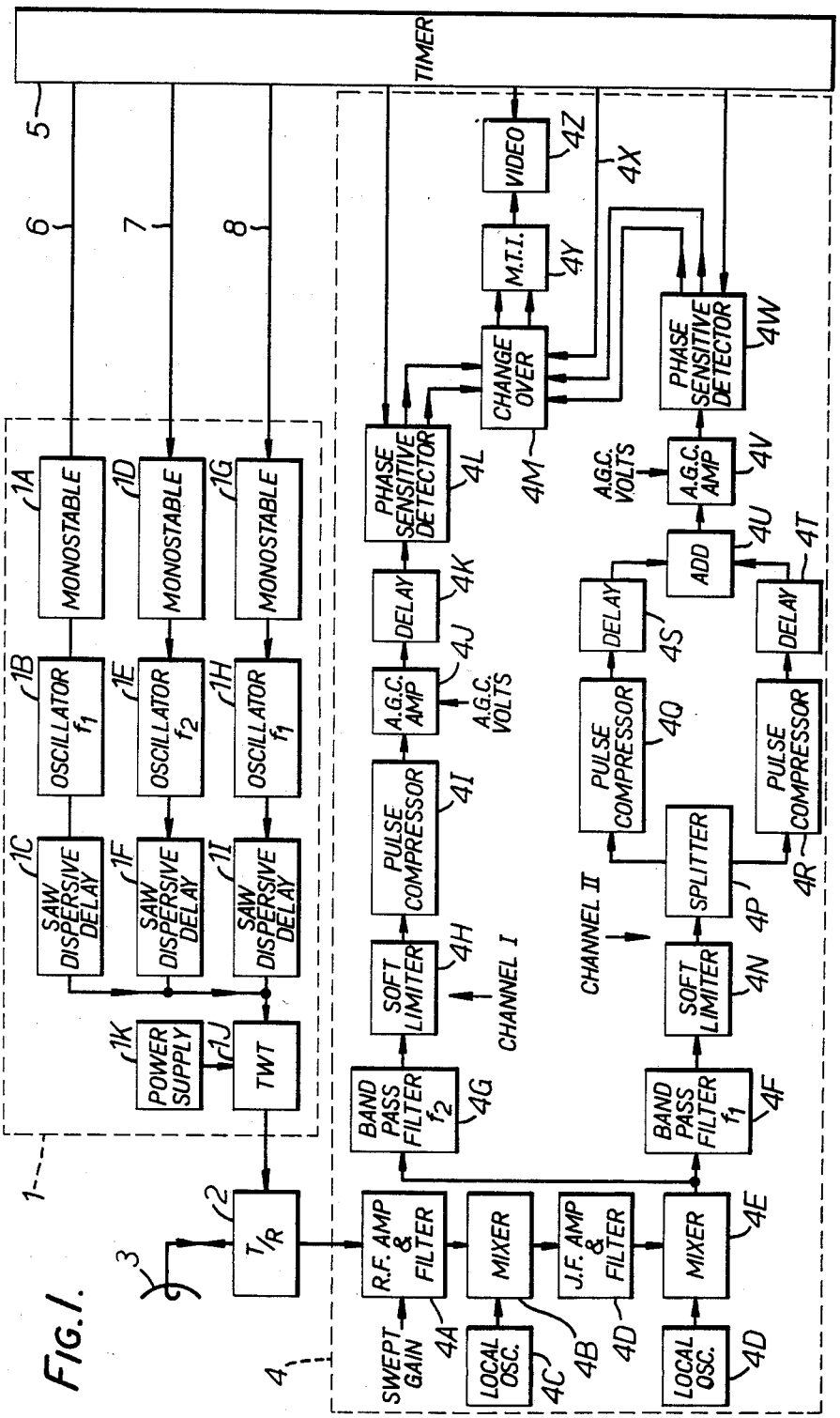
FIG. 1 is a schematic block diagram of a radar apparatus constructed in accordance with the invention.

Referring firstly to FIG. 1, there is shown a transmitter 1, a T/R cell 2, an antenna 3, a receiver 4 and a timing circuit 5.

The timer 5 produces, on line 6, at repeated intervals, a clock pulse which triggers a monostable 1A to produce a pulse which drives an oscillator 1B so as to produce a radio frequency pulse having a frequency range which will be referred to as $f_1$. A surface acoustic wave dispersive delay 1C delays different frequency components of this pulse by different amounts so as to produce a short frequency swept pulse, having a centre frequency $f_1$, between instants $t_1$ and $t_2$ as shown in FIG. 2(I). Similar timing signals on lines 7 and 8 are used by circuits 1D, 1E, 1F, 1G, 1H and 1I to produce a long, frequency swept pulse between instants $t_2$ and $t_3$ and having a centre frequency $f_2$; and a second short frequency pulse between instants $t_3$ and $t_4$ and having a centre frequency $f_1$, but being swept in the opposite direction to the first mentioned pulse between instants $t_1$ and $t_2$. The three contiguous pulses at RF frequency are amplified by a travelling wave tube 1J powered from a power supply 1K and the amplified pulses pass through the T/R cell 2 to an antenna 3 from which they are radiated. The antenna 3 is associated with a scanning system controlled by the timer 5.

Signals received by the antenna 3 are passed by the T/R cell 2 to the receiver 4 where they are subject to swept gain by an RF amplifier 4A and are mixed at 4B with a fixed frequency from local oscillator 4C. The resulting IF signals are filtered and amplified at 4D and are mixed at 4E with another fixed frequency from local oscillator 4D.

The parts 4A, 4B, 4D and 4E of the receiver suffer from a problem, known as "limiting" which will now be described with reference to FIG. 2.

Figure 2:
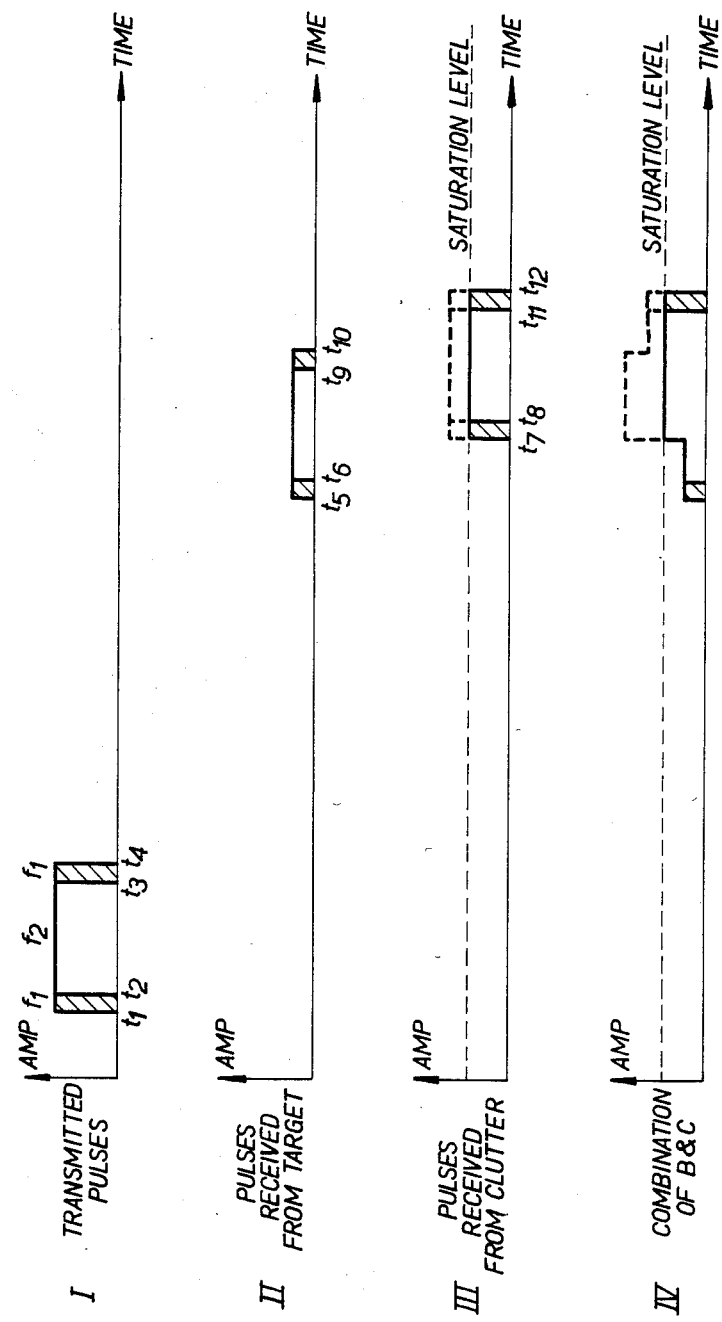
FIG. 2 illustrates at I, II, III and IV various pulses transmitted and received by the apparatus of FIG. 1.

The transmitted pulses of FIG. 2(I), when reflected from a relatively small target at a short range will produce a return like that shown at 2(II). A larger target (which may be a source of clutter) close to the first target, but at a slightly greater range will produce a return as shown in FIG. 2(III). On FIG. 2(III) the saturation level of the circuits 4A, 4B, 4D and 4E is indicated and limits the maximum amplitude of the received signals. Had the circuits had a higher saturation level the received signal would have been as shown in broken lines in FIG. 2(III). The combined effect of returns from a small close range target and a large target at a slightly greater range is shown in FIG. 2(IV) from which it will be seen that, because the receiver circuits are saturated during the period $t_9$ to $t_{10}$, the short pulse received during this period is completely masked by the stronger long pulse which saturates the receiving circuits causing them to behave non-linearly. However, only the last, $t_9$ to $t_{10}$, of the short pulses is so obscured; the first pulse, being received during period $t_5$ to $t_6$, remaining unobscured. In the case of a large target, or a large source of clutter, at a slightly shorter range than the target, the pulse received during the interval $t_5$ to $t_6$ will be obscured whilst the short pulse received during the period $t_9$ to $t_{10}$ will be unobscured. It will thus be seen that by providing two short pulses, one before and one after the long pulse, it is ensured that at least one of these pulses is received correctly when the receiver is not saturated in the manner previously described. In an alternative form of the invention, which will be described later with reference to FIG. 3, instead of providing a short pulse before and after each long pulse, a short pulse is provided before some of the long pulses and after other long pulses. A similar effect is thus achieved.

The problem of limiting is to some extent reduced by the use of swept gain at 4A, but, if the technique of swept gain is used to eliminate the limiting problem, it totally prevents the detection of small targets. Swept gain by itself cannot therefore satisfactorily be used to overcome the problem.

The long pulses are prevented from entering a channel II of the receiver by a bandpass filter 4F. They are however passed into channel I of the receiver through a bandpass filter 4G which passes frequencies within the range $f_2$. The long pulses are then passed through a soft limiter 4H which provides a linear amplification for weak signals and controlled non-linear amplification for strong signals. The pulses are then compressed by a pulse compressor 4I, amplified by a variable gain amplifier 4J, delayed at 4K and compared in a phase sensitive detector 4L with a reference signal from the timer 5. Components of the signal from 4K which are in phase and in phase quadrature with a reference signal are passed to a change over switch 4M.

The short pulses within the frequency range $f_1$ are blocked by the bandpass filter 4G and passed by the filter 4F. These short pulses are passed through a soft limiter 4N similar to 4H and are applied by a splitter 4P to pulse compressors 4Q and 4R. These compressors are matched to the different frequency sweeps applied to the different short pulses by the respective different dispersive delay devices 1C and 1I. Thus the pulse compressor 4Q serves to compress the first short pulse of each group but provides a mis-match with the second pulse which is therefore blocked. Similarly the pulse compressor 4R serves to compress the second short pulse of each group and blocks the first short pulse. In an alternative system where the short pulses are transmitted at different frequencies the pulse compressors 4Q and 4R can be preceded by appropriate bandpass filters. In that event it is not essential that different types of frequency sweep or other modulation be applied to the different short pulses. The outputs of the compressors 4Q and 4R are delayed at 4S and 4T respectively and added at 4U. The output from 4U is amplified by a variable gain amplifier 4V and the output is compared by a phase sensitive detector 4W with a reference signal from the timer 5. The components in phase and out of phase with this reference signal are passed to the changeover switch 4M.

The delays 4K, 4S and 4T are chosen so that the compressed long pulse and the two short pulses are presented at the same time to the changeover switch 4M.

The timer 5 produces, a fixed time after each clock pulse on line 6, a signal on line 4X which serves to switch the changeover switch 4M a condition where it passes the short pulses from phase sensitive detector 4W to a condition where it passes, instead, the long pulses from phase sensitive detector 4L. The timing of the signal on line 4X thus sets a range limit below which the short pulses are used and above which the long pulses are used. The output from the changeover switch 4M is passed to a moving target indicator 4Y which eliminates signals received from stationary targets in a manner which is known per se. The output from 4Y is passed to a video display 4Z which receives signals from the timer 5.

Figure 3:
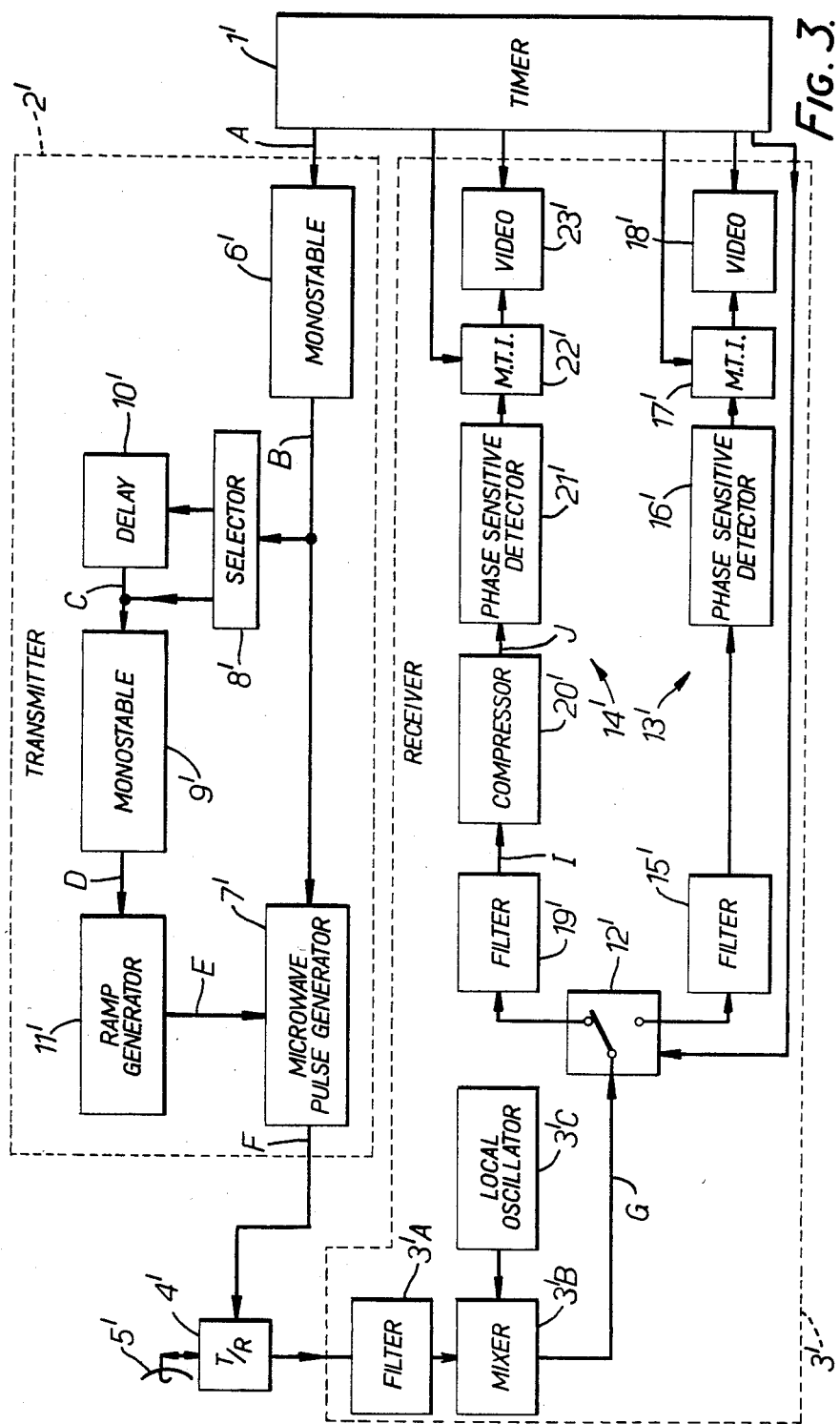
FIG. 3 is a schematic block diagram of another apparatus, also constructed in accordance with the invention.

Referring now to FIG. 3, the alternative radar illustrated therein comprises a timer $1^1$, a transmitter $2^1$, a receiver $3^1$, a T/R cell $4^1$ and an antenna $5^1$.

The transmitter receives timing signals A from the timer 1' and these timing signals are passed to a monostable circuit $6^1$, which produce pulses B as shown on FIG. 4. The pulses B are passed to the drive circuit of a microwave pulse generator $7^1$ which is caused to generate a microwave frequency output during the period of each pulse B.

Pulses B are also fed to a selector $8^1$ which passes alternate pulses directly to a monostable circuit $9^1$ whose period is slightly less than that of the monostable $6^1$. The other alternate pulses are fed indirectly to the monostable circuit $9^1$ via a delay line $10^1$. Thus the waveform at point C is as shown on FIG. 4 where alternate pulses are slightly delayed with respect to the timing pulses A.

The pulses D are passed to a ramp generator $11^1$, which produces pulses E whose timing is similar to that of pulses D, but whose amplitude increases with time. The pulses E are passed to a control input of the microwave generator $7^1$ and serve to increase its frequency by an amount depending on the voltage at the control input. Thus the output frequency of the generator $7^1$ is, during the periods of pulses E, swept through a range of frequencies slightly above the basic frequency of the microwave generator $7^1$, i.e., the frequency at which it operates when no control pulse is present at its control input. The output of the microwave generator is thus as shown at F on FIG. 4. It should be noted that waveforms F to J on FIG. 4 are plots of frequency against time in contrast to waveforms A to E which are plots of amplitude against time.

The microwave generator $7^1$ is a voltage controlled oscillator followed by an amplifier. The voltage controlled oscillator can be a PIN diode.

Referring to waveform F it will be seen that this consists of spaced pairs or groups of pulses, each pair comprising a relatively long frequency swept pulse for a period defined by a monostable $9^1$, immediately adjacent, without any time spacing, a relatively short, unswept pulse whose length is defined by the difference in periods of monostables $6^1$ and $9^1$. Furthermore it will be noted that in this particular embodiment of the invention the order of the long and short pulses is reversed in alternate pairs of pulses which means that the frequency or mean frequency of consecutive pulses does not change between pulse pairs. The pulses generated by the microwave generator $7^1$ are passed through the T/R cell $4^1$ and are transmitted as electromagnetic waves into the surrounding medium by an antenna $5^1$.

Reflections of the transmitter pulses are received by the same antenna $5^1$ and passed through the T/R cell $4^1$ to the receiver $3^1$ where they pass through a filter $3^1$A and a mixer $3^1$B where they are mixed with a frequency from a local oscillator $3^1$C. Waveform G on FIG. 4 shows signals received from two targets at different ranges. These are separated by a range gate $12^1$ into two channels $13^1$ and $14^1$ for short range and long range returns respectively. The short range channel $13^1$ incorporates a filter $15^1$ which filters out the frequency swept pulses to leave the short unswept pulses as shown at H. These are detected by circuit $16^1$ and then passed through a moving target indicator circuit $17^1$, which can operate according to any known principle, for example, using additional range gates and Doppler filters or using a delay line canceller. The effect of the circuit $17^1$ is to remove all pulses derived from stationary targets which are assumed not to be of interest. The circuit $17^1$ receives a reference timing signal from the timer $1^1$. The output of the moving target indicator circuit $17^1$ is passed to a video display system $18^1$, which also receives timing signals from the timer $1^1$, to control the timing of successive scans.

The channel $14^1$ has a filter $19^1$ which removes the short unswept pulses leaving only the swept pulses as shown at I on FIG. 4. These swept pulses are subjected to pulse compression in a circuit $20^1$, the output of which is shown at J. The output J is subjected to a treatment similar to that of pulses H, by a detector $21^1$, a moving target indicator circuit $22^1$ and a video display $23^1$.

It will readily be seen from F on FIG. 4 that, because of the reversal of the order of the long and short pulses in successive pulse-pairs, the period between successive short pulses and successive long pulses can have one of two values. There are thus two pulse repetition frequencies. This is known as p.r.f. staggering and is introduced deliberately in known radar systems to prevent blind spots in a manner known per se, e.g., as explained in the 1962 edition of Skolnik's Book "Introduction to radar systems" on page 131. The timing signals supplied to the video display and the MTI circuits need to take this staggered p.r.f. into consideration.

The embodiment of FIG. 3 also benefits, like that of FIG. 1, from the advantage that not all of the short pulse returns from a close range target are lost by saturation of the common parts $3^1$A, $3^1$B, $3^1$C of the receiver by returns from a large source of clutter at a slightly greater or lesser range than the target. Only alternate short pulse returns will be lost in this way.

It will be appreciated that the described embodiments of the invention are only two of many different forms that the invention can take. The invention is, for example, applicable to sonar systems. Also, whereas in the illustrated systems the different pulses differ in frequency, it would be possible in an alternative system for them to differ in some other way which allows them to be distinguished on reception. Another modification would be for the transmitter to produce groups of pulses similar to those shown in FIG. 4F but with the frequency sweep in opposite directions in adjacent groups. Another modification would be to use a single video system instead of the two systems shown at $18^1$ and $23^1$ in FIG. 3 so that targets of all ranges are displayed on one screen. In such an arrangement, it would be possible for the range gate 12 to be positioned at the ends of the channels 13 and 14 instead of at the beginning (as is done in the FIG. 1 embodiment). In some radar applications, it is not necessary to have a video display and the video systems shown at 4Z, $17^1$ and $23^1$ could be replaced by some form of digital processing system.

We claim:

1. Radar system comprising:

a radar transmitter including pulse producing means for producing a train of pulse groups, said pulse producing means including means for forming the pulse groups so that each group contains a long pulse and first and second short pulses separated by the long pulse, means for spacing the pulse groups so that the pulse groups are relatively widely spaced in time compared to the spacing of the pulses within each group, means for providing the short pulses of each group with distinguishing characteristics so that upon reception the first and second short pulses of a group can be distinguished from each other, and means for transmitting the train of spaced pulse groups; and receiver means for receiving pulses transmitted by said radar transmitter, said receiver means including distinguishing means for distinguishing between the first and second short pulses based upon the distinguishing characteristics, and delay means for delaying one of the short pulses so that at the output of said delay means the first and second short pulses of a group are coextensive in time.

2. Radar system according to claim 1 wherein said pulse producing means includes modulating means for modulating the long pulse of each group in a manner which allows pulse compression on reception.

3. Radar system according to claim 1 wherein said pulse producing means includes modulating means for modulating each short pulse of each group in a manner which allows pulse compression on reception.

4. Radar system according to claim 1, wherein said means for providing includes modulating means for modulating at least one of said first and second short pulses of each group and said distinguishing means uses the modulation of the at least one short pulse to distinguish between the first and second short pulses of each group.

5. Radar system according to claim 4 wherein said modulating means applies a different type of modulation to said first and second short pulses, respectively, of each group.

6. Radar system according to claim 5 wherein said modulating means frequency sweeps the first and second short pulses in respective different directions.

7. Radar system according to claim 1 wherein said means for providing produces the first and second short pulses within respective different and separate frequency ranges, and said distinguishing means includes frequency discriminating means for distinguishing between the first and second short pulses.

8. Radar apparatus according to claim 1, wherein said means for spacing includes means for causing the pulse groups to be separated from each other by an interval of time during which no transmission takes place.

9. Radar appartus comprising:
transmitter means for transmitting groups of pulses, said groups being relatively widely spaced in time compared to the spacing of the pulses within each said group, with each said group containing a long pulse and first and second short pulses separated by the long pulse, said transmitter means including means for providing the short pulses of each group with distinguishing characteristics so that upon reception the first and second pulses of a group can be distinguished from each other; and receiver means for receiving the pulses which have been transmitted by said transmitter means and which have been reflected from targets at various ranges, said receiver means including:

a first channel means for blocking the short pulses and passing the long pulses;

a second channel means including blocking means for blocking the long pulses and passing the short pulses, distinguishing means for distinguishing between the first and second pulses of each group, and delay means for delaying one of the short pulses of a group so that at the output of said delay means the first and second short pulses of a group are coextensive in time; and utilization means connected to said first and second channel means for utilizing the long pulses when received from a target located at a range above a predetermined range threshold and for utilizing the short pulses when received from a target located at a range below said predetermined range threshold.

10. Radar apparatus according to claim 9, wherein said transmitter means includes means in transmitting said groups of pulses so that the groups are separated from each other by an interval of time during which no transmission takes place.

11. Radar apparatus according to claim 9, wherein wherein said second channel means in said receiver means includes a first branch circuit for blocking the first short pulse of each said group and for passing the second short pulse of each said group and a second branch circuit for passing the first short pulse of each said group and for blocking the second short pulse of each said group.

12. Radar apparatus according to claim 11, wherein said receiver means includes delay means for delaying the long and short pulses of each said group so that such pulses are fed to said utilization means at the same time.

* * * * *